United States Patent
Imafuku (10) Patent No.: US 10,241,234 B2
(45) Date of Patent: Mar. 26, 2019

(54) SILICONE HYDROGEL SOFT CONTACT LENS HAVING WETTABLE SURFACE

(71) Applicant: HOYA CORPORATION, Shinjuku-ku (JP)

(72) Inventor: Suguru Imafuku, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 611 days.

(21) Appl. No.: 14/361,195

(22) PCT Filed: Mar. 11, 2013

(86) PCT No.: PCT/JP2013/056613
§ 371 (c)(1),
(2) Date: May 28, 2014

(87) PCT Pub. No.: WO2013/157320
PCT Pub. Date: Oct. 24, 2013

(65) Prior Publication Data
US 2014/0362339 A1 Dec. 11, 2014

(30) Foreign Application Priority Data
Apr. 18, 2012 (JP) ................. 2012-094875

(51) Int. Cl.
*G02B 1/04* (2006.01)
*B29C 39/00* (2006.01)
(Continued)

(52) U.S. Cl.
CPC ............ *G02B 1/043* (2013.01); *B29C 39/006* (2013.01); *B29C 39/02* (2013.01); *C08F 220/28* (2013.01);
(Continued)

(58) Field of Classification Search
CPC ....... G02B 1/043; B29C 39/006; B29C 39/02; B29D 11/00057; B29D 11/00076;
(Continued)

(56) References Cited

U.S. PATENT DOCUMENTS 4,395,496 A 7/1983 Wittmann et al.
5,034,461 A 7/1991 Lai et al.
(Continued)

FOREIGN PATENT DOCUMENTS

JP 55 15110 2/1980
JP 63 163811 7/1988
(Continued)

OTHER PUBLICATIONS

Notice of Reasons for Rejection dated Jun. 30, 2015 in Japanese Patent Application No. 2012-094875.
(Continued)

*Primary Examiner* — Thomas K Pham
*Assistant Examiner* — Ibrahima Diedhiou
(74) *Attorney, Agent, or Firm* — Greenblum & Bernstein P.L.C.

(57) ABSTRACT

Provided is a silicone hydrogel soft contact lens obtained by curing in a double-sided casting mold, a liquid mixture including glycerol mono(meth)acrylate and at least one type of silicone monomer having at least one hydroxyl group or polyethylene glycol group in the molecular structure thereof, the silicone hydrogel soft contact lens having a wettable surface without a polymerized lens-shaped material being subjected to post-processing to improve the water wetting properties of a surface thereof.

12 Claims, 3 Drawing Sheets

(51) Int. Cl.
*B29C 39/02* (2006.01)
*B29K 83/00* (2006.01)
*B29L 11/00* (2006.01)
*C08L 83/04* (2006.01)
*C08F 220/28* (2006.01)
*C08F 220/36* (2006.01)
*C08L 101/14* (2006.01)

(52) U.S. Cl.
CPC ........ *C08F 220/36* (2013.01); *B29K 2083/00* (2013.01); *B29L 2011/0041* (2013.01)

(58) Field of Classification Search
CPC ........ B29D 11/00038; B29D 11/00067; B29D 11/0048; C08F 220/06; C08F 220/18; C08F 220/282; C08F 220/36; C08F 230/08; C08F 2230/085; C08F 220/28; C08F 283/12; B29K 2083/00; B29L 2011/0041; C08L 101/14; C08L 83/04; C08L 83/08; C08L 51/085; C08G 77/04; C08G 77/045; C08G 77/20; Y10S 524/916; A61L 27/52
USPC .......... 351/159.33, 159.34, 2.6; 264/1.1, 2.2, 264/2.6; 525/106–108, 329.4, 329.7; 526/279, 320; 523/106–107; 524/261, 524/916; 424/429; 206/5.1; 514/915
See application file for complete search history.

(56) References Cited

U.S. PATENT DOCUMENTS 5,962,548 A * 10/1999 Vanderlaan et al. .......... 523/107
5,998,498 A * 12/1999 Vanderlaan ............ G02B 1/043
                                                351/159.33

| | | | |
|---|---|---|---|
| 2003/0162862 A1 | 8/2003 | McCabe et al. | |
| 2003/0236376 A1 | 12/2003 | Kindt-Larsen et al. | |
| 2004/0198916 A1 | 10/2004 | Nakamura et al. | |
| 2007/0231293 A1* | 10/2007 | Vanderlaan et al. ....... 424/78.04 | |
| 2011/0282008 A1* | 11/2011 | Matsuoka ............. C08F 220/28 |
| | | | 556/440 |

FOREIGN PATENT DOCUMENTS

| | | |
|---|---|---|
| JP | 3 196117 | 8/1991 |
| JP | 4 332760 | 11/1992 |
| JP | 11 502949 | 3/1999 |
| JP | 11 228644 | 8/1999 |
| JP | 11 315142 | 11/1999 |
| JP | 2993646 | 12/1999 |
| JP | 2000 191667 | 7/2000 |
| JP | 2001 183502 | 7/2001 |
| JP | 2001 311917 | 11/2001 |
| JP | 2001 323024 | 11/2001 |
| JP | 2003 215509 | 7/2003 |
| JP | 2005 513173 | 5/2005 |
| JP | 2005 539098 | 12/2005 |
| JP | 2007 160706 | 6/2007 |
| JP | 2009 522596 | 6/2009 |
| JP | 2009-530690 A | 8/2009 |
| JP | 2010 510550 | 4/2010 |
| WO | 2003 021336 | 3/2003 |

OTHER PUBLICATIONS

International Search Report dated Apr. 23, 2013 in PCT/JP13/056613 Filed Mar. 11, 2013.
Search Report issued by European Patent Office (EPO) in EPO Patent Application No. 13 77 8371, dated Dec. 4, 2015.

* cited by examiner

SILICONE HYDROGEL SOFT CONTACT LENS HAVING WETTABLE SURFACE

TECHNICAL FIELD

The present invention relates to a hydrous soft contact lens having a wettable surface. More specifically, the present invention relates to a silicone hydrogel obtained by polymerizing a mixed solution which contains at least one silicone monomer having at least one hydroxyl group or polyethylene glycol group in the molecular structure thereof and glycerol mono(meth)acrylate in a both-face cast mold, which has transparency and wettable surface, even when the silicone hydrogel is polymerized in a vessel made of hydrophobic resin material such as polypropylene, without any additional treatment for improving the surface water wettability of a polymerized lens-shaped material, or without inclusion of a high molecular weight hydrophilic polymer for enhancing the surface water wettability.

BACKGROUND ART

In wearing a contact lens, the supply of oxygen from the atmosphere is reduced, resulting in interference with corneal epithelial cell division and the occurrence of corneal thickening according to clinical results. Accordingly, improvements in oxygen permeability of the material have been attempted to supply a safer contact lens.

A hydrous soft contact lens is generally known to have good wearing comfort due to the softness of the material. However, its oxygen permeability depends on the moisture content of the lens, and therefore is lower than that of a hard contact lens. For this reason, a silicone hydrogel which contains a silicone monomer or a siloxane macromonomer has been recently developed and commercialized as one of the lens material components. As the method for manufacturing a soft contact lens, cast molding process is generally employed, since a large number of uniform products can be manufactured.

As the mold material for the cast molding process, polypropylene is often used due to easiness in molding at low cost. Polypropylene is, however, a hydrophobic material itself. In manufacturing silicone hydrogel with a molding vessel of such a material, hydrophobic monomers are oriented in a portion in contact with the polymerization vessel, so that the lens surface has high hydrophobicity after polymerization.

The lipid components of tear fluid are easily attached to the lens surface having hydrophobicity, which may cause haze on the lens or subjective symptoms such as difficulty in seeing in wearing the contact lens, or may induce eye diseases by further attachment of protein on the attached lipid components in some cases.

For these reasons, in order to remedy the hydrophobicity of the surface of a soft contact lens of silicone hydrogel, various methods have been proposed as described below.

Patent Literature 1 discloses a method for improving water wettability and abrasion resistance, which includes treating a lens material surface with plasma of active gas and/or inert gas at low temperatures, followed by exposing it to oxygen atmosphere so as to form hydroperoxide on the lens material surface, which is then immersed in an aqueous solution of hydrophilic monomers at a temperature of 100° C. or higher so as to graft polymerize the hydrophilic monomers on to the surface. This method, however, is complicated, including many steps for imparting hydrophilicity to the surface such as preparation of the copolymer, low temperature plasma treatment, immersion into an aqueous solution of hydrophilic monomer, and high temperature treatment at 100° C. or higher. The method is, therefore, not preferred for commercial production.

Patent Literature 2 discloses a silicone hydrogel including a high molecular weight hydrophilic polymer as internal wetting agent in lens material components. In this method, a high molecular weight hydrophilic polymer such as polyvinylpyrrolidone is dissolved in a polymerization solution including lens components, and the solution is then polymerized so that the high molecular weight hydrophilic polymer is contained in the lens components. This method allows a hydrophilic surface to be imparted without plasma treatment or graft polymerization of the surface. Meanwhile, after polymerization of contact lens components, unpolymerized monomers and oligomers generally remain in the polymerized lens. Since the elution of the monomers and oligomers from the lens during wearing may induce eye irritation, the monomers and oligomers are usually extracted with alcohol or alcohol solution after polymerization. On this occasion, the higher the concentration of alcohol used in the extraction is, the higher the extraction efficiency is, so that a large number of unpolymerized monomers and oligomers can be removed in a short time. In the method of Patent Literature 2, however, the high molecular weight hydrophilic polymer for imparting hydrophilicity is merely physically linked to or entangled with the network structure of a polymer. Consequently, long-time extraction with alcohol or high-concentration alcohol solution causes the high molecular weight hydrophilic polymer to be extracted from the lens together with the unpolymerized monomers and oligomers, so that good hydrophilicity cannot be maintained after extraction.

Patent Literature 3 discloses a method for manufacturing a contact lens using a casting mold formed of resin having a water absorption in the range of 0.01 to 0.15 wt %. In this method, instead of polypropylene conventionally used as a vessel material for cast molding process, a resin having higher water absorbability and excellent surface water wettability is used as the casting mold for manufacturing a contact lens, so that hydrophilic monomers are oriented in a region near the surface of the casting mold during polymerization. Consequently, a contact lens having excellent surface water wettability is manufactured. This method, however, is not preferred, causing problems in shape stability after forming due to the high water absorption of the resin, having difficulty in obtaining accuracy in forming conditions and the resin.

Patent Literature 4 discloses a silicone hydrogel including 20 to 60 wt % N-vinylpyrrolidone in monomer mixture solution for a lens component. In this method, due to the difference in reactivity between N-vinylpyrrolidone having a vinyl group and other lens components having an acryloyl group or a methacryloyl group, a homopolymer region of polyvinylpyrrolidone is formed in the lens, so that a hydrophilic surface is imparted without use of a high molecular weight hydrophilic polymer as in the method described in Patent Literature 2. In other words, N-vinylpyrrolidone having different reactivity from an acryloyl group and a methacryloyl group forms into a portion of the lens in a form similar to a homopolymer to impart hydrophilicity to the lens surface. In this method, however, use of 20 to 60 wt % N-vinyl pyrrolidone is required in order to impart hydrophilicity, so that the produced silicone hydrogel has a moisture content of 50% or more. In general, as the moisture content of a lens increases, the amount of water evaporated from the lens during wearing increases. Consequently, the wearer of the lens more frequently feels dryness. The higher moisture content a lens has, the more discomfort is felt due to drying, which is not preferred. Furthermore, polyvinylpyrrolidone exposed to the lens surface has a slippery or sticky tactile feel, being difficult to clean by scrubbing after wearing and difficult to handle in some cases, which is not preferred.

Patent Literature 5 discloses a polymer for use in manufacturing a contact lens, which is obtained from 5 to 95 wt % of at least one silicone-containing monomer and 5 to 80% of at least one hydrophilic monomer. The disclosed example of the hydrophilic monomer is glycerol methacrylate. The disclosed silicone monomers in this invention, however, are monomers and macromonomers which do not include at least one hydroxyl group or polyethylene glycol group in the molecular structure. Although glycerol methacrylate is merely disclosed as a hydrophilic monomer copolymerizable with a silicone monomer and macromonomer, no material using glycerol methacrylate is disclosed in embodiments. In the specification, there is no disclosure or suggestion of easily obtaining silicone hydrogel having excellent water wettability by injecting polymerization solution including glycerol mono(meth)acrylate into a casting mold made of polypropylene for polymerization, without any special additional treatment or use of a high molecular weight hydrophilic polymer. Furthermore, from component systems composed of a monomer not having at least one hydroxyl group or polyethylene glycol group in the molecular structure and glycerol methacrylate, no homogeneous monomer mixture solution could be prepared due to the high hydrophilicity of glycerol methacrylate (present Comparative Examples 8 to 10). In the paragraph [0029] of Patent Literature 5, three types of monomers are described as most preferable hydrophilic monomers, including N,N-dimethylacrylamide, 2-hydroxyethyl methacrylate, and N-vinyl-2-pyrrolidone. A contact lens produced from a mixture solution of the hydrophilic monomer selected from the three types and a silicone monomer, however, had white turbidity unsuitable for a contact lens, or had a lens surface with water repellency, not a wettable surface (present Comparative Examples 1 to 5).

Patent Literature 6 discloses a soft contact lens produced from 2,3-dihydroxypropyl methacrylate and organosiloxanyl methacrylate. From the two component system of 2,3-dihydroxypropyl methacrylate and a silicone monomer not having a hydroxyl group or polyethylene glycol group in the molecular structure, however, no homogeneous monomer mixture solution was obtained (present Comparative Examples 8 to 10). Since glycidyl methacrylate is added in all examples of Patent Literature 6, it appears that glycidyl methacrylate is one of the essential components. Glycidyl methacrylate, however, has strong eye irritation effect, so that the use for a component of a contact lens is not preferred in the view of biological safety. Consequently, in the case of using glycidyl methacrylate as a component of a contact lens, the polymer after polymerization is required to be treated in hot water at about 100° C. for ring-opening of the glycidyl group, which is undesirable because the polymer may be hydrolyzed by the long-time heating. Further, the manufacturing method employed in any example of Patent Literature 6 is a lace-cut process, and no cast molding process is disclosed. The problem of the cast molding process, i.e. the polymerized lens surface having high hydrophobicity due to the orientation of hydrophobic monomers in a portion in contact with a mold, is also not disclosed.

CITATION LIST

Patent Literature

Patent Literature 1: JP 2003-215509 A
Patent Literature 2: JP 2005-513173 A
Patent Literature 3: JP 2007-160706 A
Patent Literature 4: JP 2010-510550 A
Patent Literature 5: JP 11-228644 A
Patent Literature 6: JP 3-196117 A

SUMMARY OF INVENTION

Technical Problem

An object of the present invention is to provide a silicone hydrogel having a wettable surface, even using a mold material of polypropylene which is commonly used for cast molding, without use of special cast molding resin material, and without any additional treatment for improving the surface water wettability of a polymerized lens-shaped material, or without inclusion of a high molecular weight hydrophilic polymer for enhancing the surface water wettability.

Solution to Problem

As a result of extensive investigation, the present inventor found that the above object can be achieved with a silicone hydrogel obtained by polymerizing a polymerization solution which contains at least one silicone monomer having at least one hydroxyl group or polyethylene glycol group in the molecular structure and glycerol mono(meth)acrylate, so that the present invention has been accomplished. The method of the present invention allows a silicone hydrogel having wettable surface to be easily obtained without any special additional treatment or inclusion of a high molecular weight hydrophilic polymer, even using a commonly used casting mold material of polypropylene.

The present invention is as follows:

(1) A silicone hydrogel soft contact lens obtained by polymerizing a mixed solution which contains at least one silicone monomer having at least one hydroxyl group or polyethylene glycol group in a molecular structure thereof and glycerol mono(meth)acrylate in a both-face cast mold, which has a wettable surface without applying an additional treatment to improve the surface water wettability of a lens-shaped material after polymerization.

(2) The silicone hydrogel soft contact lens described in (1), wherein the silicone monomer having at least one hydroxyl group or polyethylene glycol group in a molecular structure thereof is represented by the following general formula (I):

[Formula 1]

General Formula (I)

(in which $R^1$, $R^2$, $R^3$ and $R^4$ are each a methyl group, a represents an integral number of 1 to 3, n represents 0 or 1, and m represents 0 or 4 to 10, provided that when n is 1, m is 0, and when n is 0, m is 4 to 10; X is one selected from substituents represented by the following formulae (Y1) to (Y3):)

[Formula 2]

(3) The silicone hydrogel soft contact lens described in (1) or (2), wherein the silicone hydrogel soft contact lens is obtained by polymerizing a polymerization solution containing 30 to 70 wt % of the silicone monomer having at least one hydroxyl group or polyethylene glycol group in a molecular structure thereof and 15 to 60 wt % of glycerol mono(meth)acrylate.

(4) The silicone hydrogel soft contact lens described in any one of (1) to (3), wherein the silicone hydrogel soft contact lens is obtained by polymerizing a mixed solution containing:

(a) 30 to 70 wt % of the silicone monomer having at least one of hydroxyl group or polyethylene glycol group in a molecular structure thereof, (b) 15 to 60 wt % of the glycerol mono(meth)acrylate, (c) 0 to 20 wt % of a silicone monomer not having a hydroxyl group or a polyethylene glycol group in a molecular structure thereof, (d) 0 to 50 wt % of a hydrophilic monomer, and (e) 0.1 to 1 wt % of a cross-linkable monomer.

(5) The silicone hydrogel soft contact lens described in (4), wherein the silicone monomer not having a hydroxyl group or a polyethylene glycol group in a molecular structure thereof (c) is one or more monomers selected from tris(trimethylsiloxy)-γ-methacryloxypropylsilane, and methacryloyloxyethylsuccinic acid 3-[tris(trimethylsiloxy)silyl]propyl.

(6) The silicone hydrogel soft contact lens described in (4) or (5), wherein the hydrophilic monomer (d) is one or more monomers selected from 2-hydroxyethylmethacrylate, N-vinyl-2-pyrrolidone, and methacrylic acid.

(7) The silicone hydrogel soft contact lens described in any one of (1) to (6), wherein the both-face cast mold is composed of polypropylene.

(8) The silicone hydrogel soft contact lens described in any one of (1) to (7), wherein the soft contact lens has a moisture content of 20% or more and less than 50%.

(9) A process for manufacturing a silicone hydrogel soft contact lens comprising:

a step of preparing a mixed solution by mixing at least one silicone monomer having at least one hydroxyl group or polyethylene glycol group in a molecular structure thereof, and glycerol mono(meth)acrylate;

a step of filling the mixed solution into a both-face cast mold; and a step of polymerizing the mixed solution in the both-face cast mold.

(10) A process described in (9), which does not require applying an additional treatment to improve the surface water wettability to a lens-shaped material after polymerization.

Advantageous Effects of Invention

According to the present invention, a silicone hydrogel having transparency and wettable surface can be obtained by polymerization with a both-face casting mold of a hydrophobic material such as polypropylene, without any additional treatment for improving the surface water wettability of a polymerized lens-shaped material, or without inclusion of high molecular weight hydrophilic polymer for enhancing the surface water wettability.

DESCRIPTION OF EMBODIMENTS

Although the silicone monomers for use in the present invention is not specifically limited so long as having at least one polyethylene glycol group or one hydroxyl group in the molecular structure, those represented by the following general formula (I) are preferred.

[Formula 3]

General Formula (I)

(in which $R^1$, $R^2$, $R^3$ and $R^4$ are each a methyl group, a represents an integral number of 1 to 3, n represents 0 or 1, and m represents 0 or 4 to 10, provided that when n is 1, m is 0, and when n is 0, m is 4 to 10 (average number of repetition); and X is one selected from substituents represented by the following formulae (Y1) to (Y3)):

[Formula 4]

For obtaining a water-containing soft contact lens of the present invention, the essential components is a silicone monomer having at least one hydroxyl group or a polyethylene glycol group in the molecular structure and glycerol mono(meth)acrylate. Having two hydroxyl groups in the molecular structure, glycerol mono(meth)acrylate is a monomer having extremely high hydrophilicity. Accordingly, in order to obtain a homogeneous monomer mixture solution, the molecular structure of a partner silicone monomer is required to have a hydrophilic unit such as hydroxyl group or polyethylene glycol group.

The silicone monomers having such a structure are known compounds, which are disclosed as one of contact lens materials, for example, in JP 55-15110 A, JP 63-163811 A, JP 4-332760 A, JP 2000-191667 A, JP 2001-323024 A, and U.S. Pat. No. 4,395,496, etc. The materials disclosed in JP 55-15110 A, JP 63-163811 A, JP 4-332760 A, and U.S. Pat. No. 4,395,496 are for a hard contact lens and not silicone hydrogel. The materials described in JP 2000-191667 A and JP 2001-323024 A are silicone hydrogel, and glycerol mono (meth)acrylate and 2,3-dihydroxypropyl (meth)acrylate, which is another name of glycerol mono(meth)acrylate (e.g. in paragraph [0029] in JP 2000-191667 A, and in paragraph [0034] in JP 2001-323024 A), these describes are merely shown examples of the copolymerizable monomer. In the embodiments, however, glycerol mono(meth)acrylate and 2,3-dihydroxypropyl (meth)acrylate are not used.

The silicone monomer for use in the present invention is particularly preferred to be a monomer of the following structures A1 to A8. In the present specification, a polyethylene glycol group has a number of repletion (average) of ethylene glycol in the range of 4 to 10.

[Formula 5-1]

-continued

(A3)

(A4)

(A5)

(A6)

[Formula 5-2]

(A7)

(A8)

In the formulae A3 to A8, m is 4 to 10. Examples of the method for introducing a polyethylene glycol group in the molecular structure of a silicone monomer include the following. One terminus of ethylene glycol such as tetraethylene glycol, pentaethylene glycol, hexaethylene glycol, heptaethylene glycol, octaethylene glycol, nonaethylene glycol, and decaethylene glycol is allylated, and then reacted with a tris(trimethylsiloxy)silyl group or a methyl-bis(trimethylsiloxy)silyl group by hydrosilylation reaction. Subsequently, a hydroxyl group at one terminus is reacted with a compound having a methacryloyl group (e.g. methacrylic chloride, 2-isocyanatoethyl methacrylate, and 2-methacryloyloxyethoxyethyl isocyanate) so as to produce an objective silicone monomer. On this occasion, due to the difficulty of acquiring a single glycol product having 4 or more repeating units of polyethylene glycol, glycols having a plurality of numbers of repetition are generally mixed. The monomers A3 to A8 for use in the present invention may have varied values of m with an average of about 4 to about 10, or may have a unvaried number of repetition of glycol by synthesis of the silicone monomer from precursor glycols with a single repetition number prepared by column fractionation or the like (e.g. for n=6, excluding other numbers such as 5 or 7). In order to reduce the dispersion in various physical properties such as mechanical strength and water wettability of a lens to be obtained, preferably the polyethylene glycol has a single unit structure with no distribution of the number of repetition.

With a repetition number m of 4 or more, a homogeneous monomer mixture solution can be obtained due to excellent compatibility with glycerol mono(meth)acrylate. With a repetition number m of 10 or less, the length of molecular structure is not too large, so that reduction in mechanical strength of a lens can be prevented while maintaining the surface water wettability, which is preferable.

The term "average" in the present specification is used when the number of repetition of the polyethylene glycol group in a silicone monomer structure has variation, and refers the number of repetition calculated from the peak integrated intensity ratio of ethylene oxide units in $^1$H-NMR analysis of a precursor as starting material or a final structure.

The contact lens of the present invention has a content of silicone monomer of preferably 30 to 70 wt %. With a silicone monomer content of 30 wt % or more, a contact lens prepared from the material is imparted with sufficient oxygen permeability. With a silicone monomer content of 70 wt % or less, the material can be imparted with an adequate moisture content and a more flexible lens can be obtained. The silicone monomer content is more preferably 40 to 70 wt %, furthermore preferably 40 to 65 wt %. In the present invention, a silicone monomer has a number of silicon atom in the molecular structure of 4 or less and a molecular weight of less than 1,000, or has a calculated polystyrene equivalent number average molecular weight of less than 1,000 in the measurement by gel permeation chromatography for distributed repetition numbers of polyethylene glycol group.

In the present invention, due to the large molecular weight of a siloxane macromonomer or a fluorine-containing siloxane macromonomer for use, or due to the high water repellency of fluorine atom of a fluorine-containing monomer for use, a hydrophobic portion tends to be oriented toward the mold surface made of polypropylene, or at the lens surface. Consequently, the lens surface has high water repellency in some cases. In the present invention, therefore, a siloxane macromonomer, a fluorine-containing siloxane macromonomer, and a fluorine-containing monomer are preferably not used as a raw material component. In the present invention, a macromonomer has a calculated polystyrene equivalent number average molecular weight of 1,000 or more in the measurement by gel permeation chromatography. Examples of the macromonomer include macromonomers described in JP 2001-311917 A, JP 2001-183502 A, and JP 11-502949 A. The fluorine-containing monomer has one or more fluorine atoms in the molecular structure with a molecular weight of less than 1,000. Examples of the fluorine-containing monomer include 2,2,2-trifluoroethyl methacrylate, 1,1,1,3,3,3-hexafluoroisopropyl methacrylate, and perfluorooctyl ethyl oxypropylene methacrylate.

In the soft contact lens of the present invention, glycerol mono(meth)acrylate is used as a second essential component. The use of glycerol mono(meth)acrylate as a lens component allows a silicone hydrogel having a wettable surface to be easily obtained, without any special additional treatment or inclusion of a high molecular weight hydrophilic polymer, even when using polypropylene as casting mold material, which is commonly used as a conventional mold material for a contact lens. It is considered that such a peculiar effect is exhibited due to the molecular structure of glycerol mono(meth)acrylate having two hydroxyl groups. In other words, it is believed that the silicone structure with high hydrophobicity are oriented at the surface of lens in dry state, and once the lens surface is covered (wetted) with water, glycerol mono(meth)acrylate structure is oriented to the surface so as to strongly hold water molecules due to high molecular mobility of silicone hydrogel, resulting in formation and preservation of the wettable surface. The soft contact lens of the present invention thus exhibits high water repellency (high contact angle) in dry state, and once the surface is wetted, the surface stays uniformly covered with a water film for long hours. After scrubbing with a soft contact lens cleaning solution and subsequent rinsing with distilled water or a soft contact lens rinsing solution, the lens surface is, therefore, uniformly covered with a water film, having a low contact angle measured in water by a captive bubble method.

Not all the molecular structure having two or more hydroxyl groups, however, have the same effect on the properties. Examples of the easily available compounds include 2-methacryloyloxyethyl acid phosphate (the following formula B1) and N-[tris(hydroxymethyl)methyl]acrylamide (the following formula B2). The use of 2-methacryloyloxyethyl acid phosphate, however, allows for no improvement in the surface water wettability, colors the lens in yellow, and makes a lens brittle, being incapable for use as a contact lens (refer to the present Comparative Example 6). The use of N-[tris(hydroxymethyl)methyl]acrylamide allows for no compatibility with other monomers, so that a homogeneous monomer mixture solution cannot be obtained (refer to the present Comparative Example 7). Accordingly, in the present invention, use of glycerol mono(meth)acrylate is critical.

[Formula 6]

(B1)

(B2)

Glycerol mono(meth)acrylate as an essential component has structural isomers such as the following formulae (C1) and (C2). In the present invention, a mixture of structural isomers may be used, or one composed of either one of the structures alone may be used.

[Formula 7]

(C1)

(C2)

(wherein, $R^5$ is a hydrogen atom or a methyl group).

In the specification, "(meth)acrylate" means both acrylate and methacrylate.

The contact lens of the present invention has a glycerol mono(meth)acrylate content of preferably 15 to 60 wt %. With a glycerol mono(meth)acrylate content of 15 wt % or more, a silicone hydrogel having a wettable surface can be easily obtained, without any special additional treatment or inclusion of a high molecular weight hydrophilic polymer, even when using polypropylene as casting mold material, which is commonly used as a conventional mold material. With a glycerol mono(meth)acrylate content of 60 wt % or less, reduction in mechanical strength of a lens can be prevented. The glycerol mono(meth)acrylate content is more preferably 20 to 50 wt %.

In the present invention, "any special additional treatment" means a method for improving the surface water wettability of a contact lens such as a plasma treatment, a grafting treatment, a base treatment, and an acid treatment. The wettable surface means the surface of a contact lens uniformly covered with a water film even after scrubbing both sides of the contact lens with a soft contact lens cleaning solution and subsequent rinsing with distilled water or a soft contact lens rinsing solution.

The hydrous soft contact lens of the present invention may further include a silicone monomer not having a hydroxyl group or a polyethylene glycol group in the molecular structure for improving oxygen permeability, a hydrophilic monomer for adjusting moisture content, and a cross-linkable monomer for imparting mechanical strength and durability, in addition to the above-mentioned two components.

Examples of the silicone monomer not having a hydroxyl group or a polyethylene glycol group in the molecular structure include one or more monomers such as tris(trimethylsiloxy)-γ-methacryloxypropylsilane, methacryloyloxyethylsuccinic acid 3-[tris(trimethylsiloxy)silyl]propyl, methacryl amidopropyl-bis(trimethylsiloxy)methylsilane, O-methacryloxyethoxy-N-[bis(trimethylsiloxy)methylsilyl] propyl carbamate, methacryloxymethyl-bis(trimethylsiloxy) methylsilane, 3-methacryloxypropyl-bis(trimethylsiloxy) methylsilane, methacryloxymethyl-tris(trimethylsiloxy) silane, and methacryloxypropyl-bis(trimethylsiloxy)silanol, which can be used in a range of 0 to 20 wt %. With a content of these silicone monomers of 20 wt % or less, a homogeneous monomer mixture solution can be made without white turbidity, preventing water repellency of the lens surface.

Examples of the hydrophilic monomer for adjusting moisture content include one or more monomers selected from 2-hydroxyethyl methacrylate, N-vinyl-2-pyrrolidone, methacrylic acid and the like, which can be used in a range of 0 to 50 wt %. With a content of these hydrophilic monomers of 50% or less, an appropriate moisture content can be imparted to a lens. The content of the hydrophilic monomer is more preferably 0 to 45 wt %, furthermore preferably 0 to 40 wt %.

Examples of the cross-linkable monomer for imparting mechanical strength and durability include one or more monomers selected from ethylene glycol di(meth)acrylate, triethylene glycol di(meth)acrylate, tetraethylene glycol di(meth)acrylate, allyl methacrylate, vinyl methacrylate, diallyl maleate, and triallyl isocyanurate and the like. The content of the cross-linkable monomer component thereof is preferably 0.1 to 1 wt % relative to the total amount of the copolymer components. With a usage of these cross-linkable monomers of 0.1 wt % or more, the mechanical strength and durability can be imparted. With a usage of these cross-linkable monomers of 1 wt % or less, embrittlement of a produced soft contact lens can be prevented. The content of the cross-linkable monomer is more preferably 0.2 to 0.8 wt %.

The hydrous soft contact lens of the present invention may further include, for example, a polymerizable ultraviolet absorber and a polymerizable dye as copolymer components for imparting ultraviolet absorbing ability to the soft contact lens to be produced, and for coloring for the improvement of visibility. Examples of the polymerizable ultraviolet absorber include 5-chloro-2-[2-hydroxy-5-(β-methacryloyloxyethyl carbamoyloxyethyl)]phenyl-2H-benzotriazole, 2-[2-hydroxy-5-(β-methacryloyl oxyethyl carbamoyloxyethyl)]phenyl-2H-benzotriazole, 5-chloro-2-[2-hydroxy-4-(p-vinylbenzyloxy-2-hydroxypropyloxy)]-phenyl-2H-benzotriazole, 4-methacryloxy-2-hydroxybenzophenone, and 2-(2'-hydroxy-5'-methacryloxyethyl phenyl)-2H-benzotriazole and the like. Examples of the polymerizable dye include 1,4-bis(4-vinylbenzylamino)anthraquinone, 1-p-hydroxybenzylamino-4-p-vinylbenzylamino anthraquinone, 1-anilino-4-methacryloylamino anthraquinone, and 1,4-bis[4-(2-methacryloxyethyl)phenylamino]-9,10-anthraquinone and the like.

In coloring the hydrous soft contact lens of the present invention, a vat dyeing may be employed without use of these dyes. In the method, the lens is immersed in a vat dyeing bath such that the entire lens is sufficiently impregnated with leuco dye, and then immersed in an oxidation bath so that the leuco dye is oxidized to be fixed. Alternatively, the material for the contact lens of the present invention may include a phthalocyanine dye such as Alcian Blue 8GX and Alcian Green 2GX as coloring agent. Since the content of the polymerizable ultraviolet absorber and the polymerizable dye is influenced by the thickness of the lens to be made from the material, the appropriate content thereof is preferably 5 wt % or less relative to the copolymer components, particularly preferably 0.02 to 3 wt %. A usage of 5 wt % or less prevents the reduction in mechanical strength of the contact lens to be produced, being preferable from the standpoint of safety of the contact lens in direct contact with a living body.

In manufacturing the hydrous soft contact lens of the present invention, firstly, a polymerization initiator is added to a mixture solution which contains the monomers. The solution is sufficiently stirred to produce a homogeneous monomer mixture solution. Examples of the polymerization initiator for use include a peroxide such as lauroyl peroxide, cumene hydroperoxide, and benzoyl peroxide, 2,2'-azobis (2,4-dimethylvaleronitrile), and 2,2'-azobis(isobutyronitrile), and in the case of employing a photopolymerization process, including benzoin methyl ether, 1-hydroxycyclohexyl phenyl ketone, 2,2-dimethoxy-2-phenylacetophenone, 2-hydroxy-2-dimethoxy-1-phenylpropane-1-one, phenylbis (2,4,6-trimethylbenzoyl)phosphine oxide, and 2,4,6-trimethylbenzoyl-diphenyl-phosphine oxide. The amount of the polymerization initiator is variously selected depending on the polymerization temperature, irradiation wavelength and irradiation intensity of light, preferably 0.1 to 1 wt %.

The polymerization can be performed in the presence or absence of a proper diluent. The proper diluents may be any type as long as the monomer components for use are homogeneously dissolved, including, for example, alcohols (e.g. ethanol, n-hexanol, octanol, 1,3-propanediol, and 1,4-butanediol), and a dipolar aprotic solvent such as dimethyl sulfoxide. The use of diluents allows for easy injection to a mold due to the reduced viscosity of a monomer mixture solution. In addition, effects such as effectively removing polymerization heat during polymerization, improving the mechanical strength of a produced lens, and lowering the elastic modulus of the lens can be expected.

The monomer mixture solution is polymerized after injected in a mold having the shape of a contact lens for manufacturing the contact lens. The mold is a matched mold having convex and concave curvatures, made of material such as metal or resin. Preferably the material has good releasability during polymerization, with excellent resistance to solvent and heat resistance. A mold made of resin is preferred, since the mold having a shape required for a desired lens design can be easily made. The resin material is preferably selected from materials having low molding shrinkage, good surface transfer characteristics from metal, and excellent dimensional accuracy and resistance to solvent. Polypropylene is preferred due to cost and easy availability. The resin material, however, is not limited to polypropylene. For example, polyethylene, polyethylene terephthalate, polymethylpentene, polysulfone, polyphenylene sulfide, a cyclic olefin copolymer, and an ethylene-vinylalcohol copolymer may be used.

In filling into a mold the monomer mixture solution, the mold may be used immediately after molding, or may be used after stored for 10 to 40 hours for stabilization of the curvatures of the mold. Prior to use of the mold, reactive substances such as moisture and oxygen at the mold surface are removed under sufficiently reduced pressure, and the monomer mixture solution may be filled into the mold after purging with an inert gas such as nitrogen or argon. Furthermore, prior to filling thereinto the monomer mixture solution, oxygen dissolved in the monomer mixture solution for use may be removed by bubbling with an inert gas such as nitrogen or argon, or the solution may be used without removal of dissolved oxygen.

Examples of the polymerization method include a photopolymerization method which includes blending the photopolymerization initiator, exposing to ultraviolet light, visible light, or the like. In application of the photopolymerization method, the wavelength of the irradiated light is properly selected depending on the characteristics of the blended photopolymerization initiator. For example, a lamp having strong peaks at 200 to 280 nm region and at 350 nm, a lamp having an enhanced region of 350 to 400 nm, a lamp having an enhanced region of 400 to 425 nm around a central region of 420 nm, and a lamp having an enhanced region of 400 to 450 nm may be used. The irradiation intensity of light is different depending on the light receiving area of a device for measuring the irradiation intensity. Preferably polymerization is performed under an irradiation intensity in the range about 10 to 60 mW/cm$^2$ measured with a UV Power MAP made by Fusion UV Systems Japan Co., Ltd. for about 1 to 30 minutes. On this occasion, the atmosphere may be air. Alternatively, the polymerization may be performed under inert gas such as nitrogen or argon for improving the polymerization rate of a contact lens to be produced. In polymerization, a thermal polymerization method may be also used, in which, for example, the temperature is stepwisely or continuously raised in the range of 20 to 120° C. such that the polymerization is completed in 30 minutes to 24 hours. On this occasion, the environment in a polymerization oven may be under atmospheric conditions, or polymerization may be performed in an atmosphere of inert gas such as nitrogen or argon under pressurized conditions. In polymerization under pressurized conditions, the pressure in the oven is preferably in a range of 0.5 to 3 kgf/cm$^2$. Alternatively, a polymerization method including both of photopolymerization and thermal polymerization may be employed. In the method, after the photopolymerization for a time period in a range of 1 to 30 minutes, the mold is then transferred to a polymerization oven for thermal polymerization, where the temperature is stepwisely or continuously raised in the range of 20 to 120° C. for heating for 30 minutes to 24 hours, or the temperature is preset to a constant temperature (90 to 120° C.) for heating for 10 to 60 minutes.

A lens-shaped polymer taken out from the mold after polymerization can be treated by extraction with a solvent (e.g. methanol, ethanol, isopropanol, aqueous methanol solution, and aqueous ethanol solution) to remove the unpolymerized monomers and oligomers. Subsequently, the polymer is immersed in saline, a soft contact lens preserving solution, or the like for hydration, so that an objective hydrous soft contact lens can be obtained.

The moisture content of the hydrous soft contact lens of the present invention is preferably 20% or more and less than 50%. With a moisture content of less than 20%, appropriate flexibility cannot be imparted to a lens. With a moisture content of 50% or more, the evaporation rate from the lens is increased, so that dryness tends to be felt during wearing the lens, which is undesirable. More preferably, the moisture content of the lens is 20 to 45%.

EXAMPLES

The present invention is described in more detail in the following Examples. However, the present invention is not intended to be limited to these Examples.
[Component for Use]
The names and abbreviations of chemicals for use in the following Examples are described in the following.

(a) Silicone monomer having at least one hydroxyl group or polyethylene glycol group in the molecular structure
  4Si-6PEG: Silicone monomer obtained in Synthesis Example 1
  3Si-9PEG: Silicone monomer obtained in Synthesis Example 2
  3 Si-GMA: Methacryloxy-2-hydroxypropoxypropylbis(trimethylsiloxy)methylsilane
(b) Glycerol mono(meth)acrylate
  GlyMA: Glycerol monomethacrylate
(c) Silicone monomer not having a hydroxyl group or a polyethylene glycol group in the molecular structure
  MTS: Methacryloyloxyethylsuccinic acid 3-[tris(trimethylsiloxy)silyl]propyl
  TRIS: Tris(trimethylsiloxy)-γ-methacryloxypropylsilane
  TRIS-VC: Tris(trimethylsiloxy)silylpropylvinyl carbamate
(d) Hydrophilic monomer
  HEMA: 2-hydroxyethyl methacrylate
  NVP: N-vinyl-2-pyrrolidone
  MAA: Methacrylic acid
  DMAA: N,N-dimethylacrylamide
(e) Cross-linkable monomer
  EDMA: Ethylene glycol dimethacrylate
  DAM: Diallyl maleate
  VMA: Vinyl methacrylate
(f) Other monomer
  P-1M: 2-methacryloyloxyethyl acid phosphate
  TRIS-AA: N-[tris(hydroxymethyl)methyl]acrylamide
(g) Polymerization initiator
  AIBM: 2,2'-azobis(isobutyronitrile)
  BAPO: Phenylbis(2,4,6-trimethylbenzoyl)phosphine oxide

Synthesis Example 1

Synthesis of Silicone Monomer Having a Repetition Number of PEG Portion of 6 Alone A purchased commercial hexaethylene glycol was column-refined to have a repetition number of PEG portion of 6 alone. Only one terminus of hexaethylene glycol was then protected with trityl chloride (Reaction formula 1). The other terminus was allylated with allyl chloride (Reaction formula 2), and then imparted with tris(trimethylsiloxy) silane by hydrosilylation reaction with a platinum catalyst (Reaction formula 3). Finally, the trityl group was deprotected to produce a siloxane compound (the following formula D1) having a repetition number of ethylene oxide of 6 alone.

[Formula 8]

Reaction formula 1

[Formula 9]

Reaction formula 2

-continued

[Formula 10]

Reaction formula 3

Figure 1:
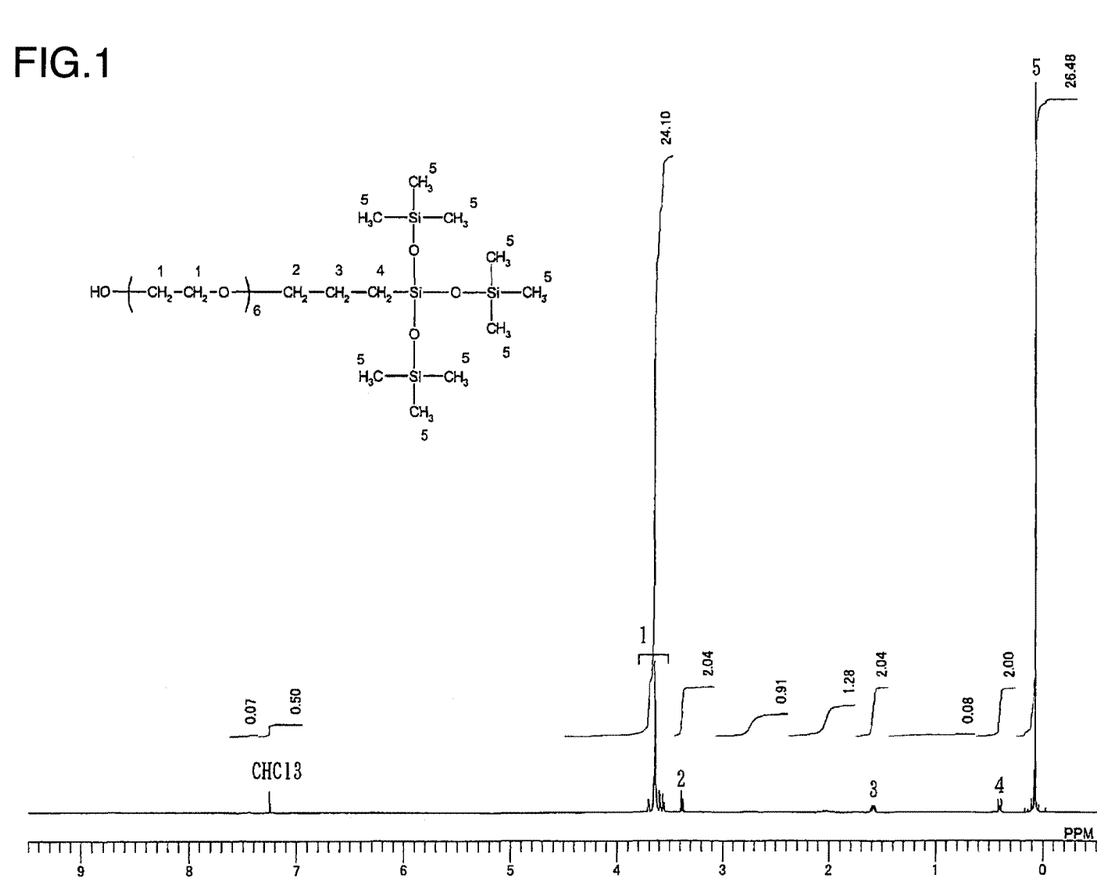
FIG. 1 is a $^1$H-NMR spectrum of a compound obtained in Synthesis Example 1.
Figure 2:
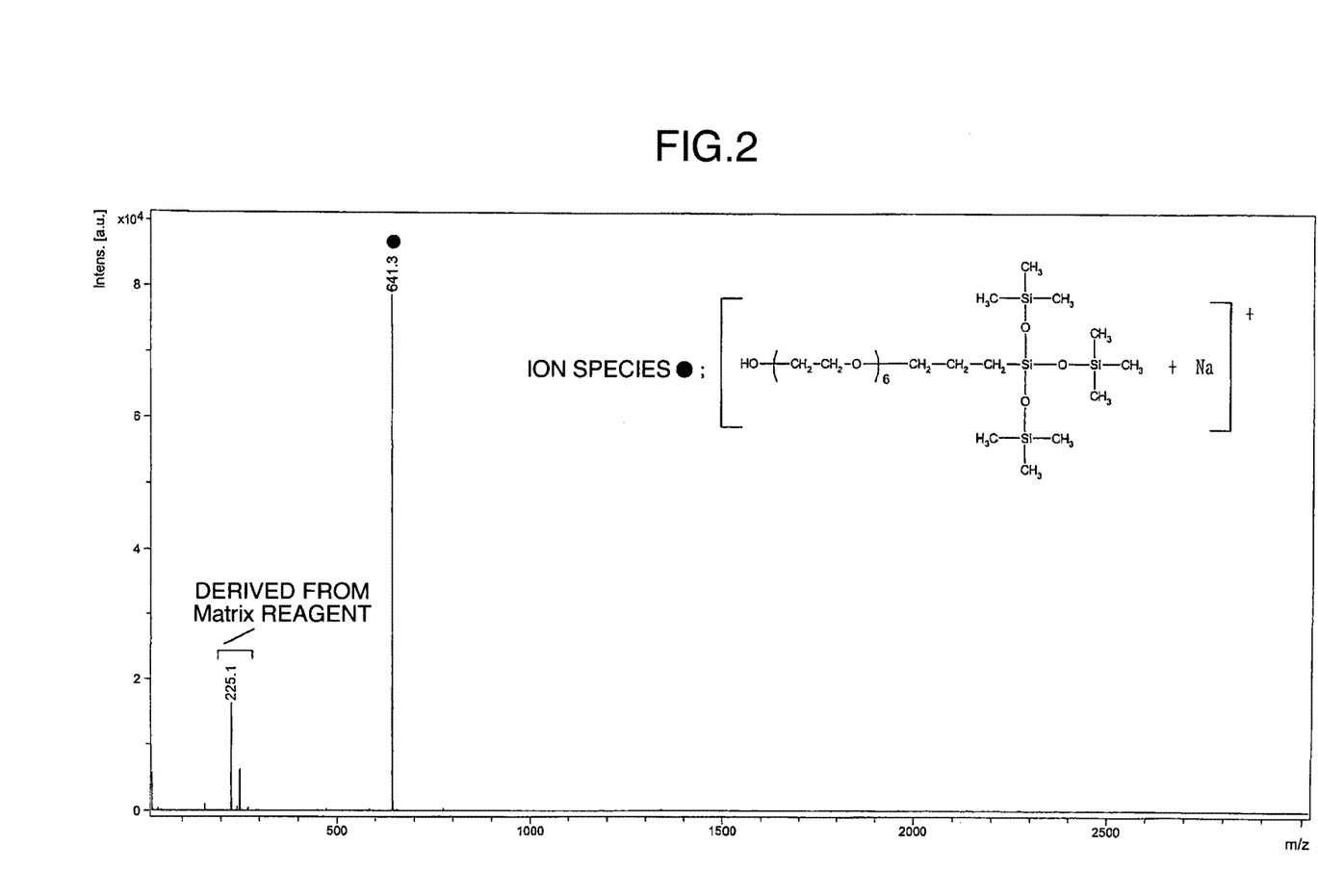
FIG. 2 is a MALDI-TOF MS spectrum of a compound obtained in Synthesis Example 1.

The ¹H-NMR spectrum of the compound is shown in FIG. 1, and the MALDI-TOF MS spectrum is shown in FIG. 2. From the ¹H-NMR spectrum, peaks derived from ethylene oxide unit (3.6 ppm) and tris(trimethylsiloxy)propyl silane structure (3.4 ppm, 1.6 ppm, 0.4 ppm, and 0.1 ppm) were detected. From the MALDI-TOF MS spectrum, ions [M+Na]⁺ derived from the structure m/z 641 were detected and ions with other unit numbers (e.g. 5 or 7) were not detected, so that it was confirmed that the produced compound has a repetition number of ethylene oxide of 6 alone.

[Formula 11]

(D1)

NMR measurement conditions are as follows.
  Observation frequency: ¹H; 600 MHz
  Measuring solvent: CDCl₃
  Measurement temperature: room temperature
  Chemical shift reference: measuring solvent (¹H, 7.25 ppm)
Measurement conditions of MALDI-TOF MS are as follows.
  Laser light source: N2 laser (wavelength: 337 nm)
  Measurement mode: reflector mode, positive ion mode
  Measured mass range (m/z): 20 to 3,000
  Cumulative number: 500 times
  Ionizing reagent: sodium trifluoroacetate (THF solution)

Subsequently, a siloxane compound represented by the D1 was reacted with methacryloyl chloride, using 1,8-diazabicyclo[5.4.0]-7-undecene as catalyst, in n-hexane solvent. The solution after reaction was filtered with a glass fiber filter, washed with methanol and subsequently with an aqueous saturated sodium chloride solution, column-refined, and distillated to remove the solvent, so that a silicone monomer represented by the following formula D2 (hereinafter referred to as 4Si-6PEG) was obtained.

[Formula 12]

Synthesis Example 2

Figure 3:
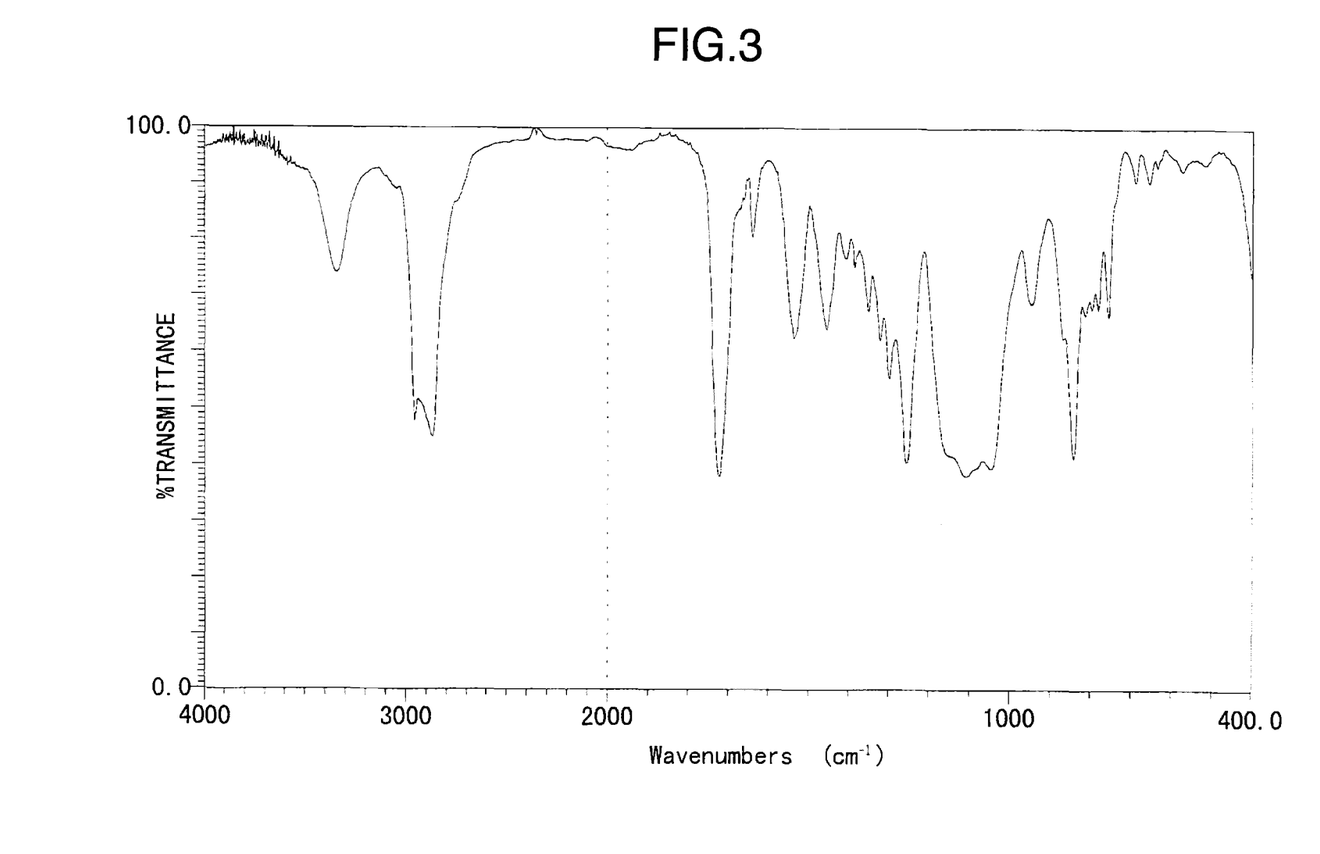
FIG. 3 is an IR spectrum of a compound obtained in Synthesis Example 2.

Synthesis of Silicone Monomer Having Repetition Number Average of 9 at PEG Portion As starting raw material, 3-[hydroxy(polyethyleneoxy)propyl]heptamethyltrisiloxane having a repetition number of ethylene oxide of 1 to 17, with an average of repetition number of 9 at a PEG portion was used. The compound was reacted with 2-isocyanatoethyl methacrylate in the presence of a catalyst (dibutyltin dilaurate) in methylene chloride solvent. The reaction was performed until the isocyanate absorption band in the IR spectrum disappeared. After completion of the reaction, filtration and distillation of solvent were performed, so that a silicone monomer represented by the following formula D3 (hereinafter referred to as 3Si-9PEG) was obtained. The IR spectrum of the compound is shown in FIG. 3. The molecular weight was measured by gel permeation chromatography, resulting in a number-average molecular weight of 907 (polystyrene equivalent).

into a brown glass bottle with a capacity of 20 mL, which were stirred at room temperature for 16 hours. The monomer mixture solution was filled into a both-face cast mold of polypropylene for making a contact lens and into a cell made of polypropylene plates which sandwich a polyethylene terephthalate sheet as spacer having a different thickness, and irradiated with light having an irradiation intensity of 30 mW/cm$^2$ in the wavelength range of 395 to 445 nm for 10 minutes using the V-bulb of a UV-curing device (made by Fusion UV Systems Japan K.K.). Subsequently, the mold and the cell were placed in a hot air circulating drying machine preset to 110° C. and heated for 60 minutes for completion of the polymerization.

After polymerization, the lens-shaped polymer product and plate-like polymer product were taken out from the molds, immersed in 50 vol % ethanol aqueous solution for 4 hours, and substituted with distilled water and then with a soft contact lens rinsing liquid (trade name: PURE SOAK S, made by HOYA Corporation), so that a soft contact lens and a plate-like polymer product were obtained. The produced soft contact lens and plate-like polymer product were measured and evaluated as follows. The results are described in Table 1. The produced soft contact lens had high transparency and highly wettable surface.

[Characteristics of Monomer Mixture]

Before polymerization, a part of monomer mixture solution was put into a transparent glass bottle and was visually evaluated according to the following evaluation criteria.
Evaluation Criteria
O: Monomer mixture solution is homogeneously dissolved.
X: Monomer mixture solution has white turbidity or separates into two layers without dissolution.

[Evaluation of Transparency of Soft Contact Lens]

The transparency of a soft contact lens was visually evaluated according to the following evaluation criteria.
Evaluation Criteria
O: Lens is transparent.
X: Lens has white turbidity or yellow color.

[Formula 13]

Measurement conditions of gel permeation chromatography (GPC) were as follows.
  Column: Shodex KF-402.5HQ, 2 pieces
  Eluent: THF
  Flow rate: 0.3 mL/min
  Detector: RI
  Column temperature: 40° C.

Example 1

Firstly, 10 g (50 wt %) of 4Si-6PEG obtained in Synthesis Example 1, 10 g (50 wt %) of GlyMA, 0.06 g of EDMA as a cross-linkable monomer (0.3 wt % relative to the total amount of 4Si-6PEG and GlyMA) and 0.12 g (0.6 wt % relative to the total amount of 4Si-6PEG and GlyMA) of BAPO as a polymerization initiator were weighed and fed

[Wettability]

Both sides of a soft contact lens were scrubbed with a soft contact lens cleaning solution (trade name: PURE CLEANER S made by HOYA Corporation) and then thoroughly rinsed with distilled water. After rinsing, the soft contact lens picked up with tweezers was visually evaluated on the surface water wettability of the contact lens according to the following evaluation criteria.
Evaluation Criteria
O: Lens surface is uniformly covered with a water film.
X: Lens surface has water repellency, having almost no portion covered with a water film.

[Moisture Content]

The weight of a soft contact lens in water-containing state of equilibrium swelling at 23° C. (Ww), and the weight of the lens in dry state dried with a vacuum dryer at 70° C. for 4 hours or more (Wd) were measured, and the moisture content was calculated by the following expression:

Moisture content(%)=(Ww−Wd)/Ww×100

[Oxygen Permeability Coefficient]

The plate-shaped polymer products having different thickness were punched out with a trephine punch (11 mm in diameter) for corneal epithelium. The measurement of oxygen permeability coefficient was performed in saline solution at 35° C. with an instrument for measuring film oxygen transmission rate by electrode method made by Tsukuba Rika Seiki Co., Ltd. The unit of oxygen permeability coefficient is $(cm^2/sec)\times(mLO2/mL\times mmHg)$. The oxygen permeability coefficient described in the table is a value obtained by multiplying the original oxygen permeability coefficient by $10^{11}$.

[Contact Angle Measurement (Sessile Drop Method and Captive Bubble Method)]

The surface water wettability of a soft contact lens was evaluated by contact angle measurement. After wiping off the moisture on the soft contact lens surface, the lens was attached to a holding stage for the measurement of the contact angle by sessile drop method using distilled water. A contact angle meter made by Kyowa Interface Science Co., Ltd. was used for the measurement. The size of a droplet was set to about 1.5 mm using a syringe.

Alternatively, the soft contact lens was attached to a holding stage, and immersed in distilled water at 25° C. together with the holding stage. A bubble of about 1.7 μL was attached to the soft contact lens surface with a syringe. The angle formed by the soft contact lens and the bubble in the distilled water was measured. In either of the measurement methods, the smaller the value is, the better water wettability can be achieved.

Examples 2 to 10

Except that the monomer composition of the soft contact lens was changed to the composition described in Table 1, the manufacturing method was the same as in Example 1. The produced soft contact lens had high transparency and surface wettability.

Examples 11 and 12

The monomer composition of the soft contact lens was changed to the composition described in Table 1 so as to obtain the monomer mixture solution. The monomer mixture solution was filled into a both-face cast mold of polypropylene for making a contact lens and into a cell made of polypropylene plates which sandwich a polyethylene terephthalate sheet having a different thickness as spacer. The mold and the cell were placed in a hot air circulating drying machine preset to 110° C. and heated for 60 minutes for completion of the polymerization.

After polymerization, the lens-shaped polymer product and the plate-like polymer product were immersed in 50 vol % ethanol aqueous solution for 4 hours, and substituted with distilled water and further with a soft contact lens rinsing liquid (trade name: PURE SOAK S, made by HOYA Corporation), so that a soft contact lens and a plate-like polymer product were obtained. The produced soft contact lens and plate-like polymer product were measured and evaluated as follows. The results are described in Table 1. The produced soft contact lens had high transparency and highly wettable surface.

Examples 13 to 16

The monomer composition of the soft contact lens was changed to the composition described in Table 1 so as to obtain a monomer mixture solution. The monomer mixture solution was filled into a both-face cast mold of polypropylene for making a contact lens and into a cell made of polypropylene plates which sandwich a polyethylene terephthalate sheet having a different thickness as spacer, and irradiated with light having an irradiation intensity of 30 mW/cm² in the wavelength range of 395 to 445 nm for 5 minutes using the V-bulb of a UV-curing device (made by Fusion UV Systems Japan K.K.). Subsequently, the mold and the cell were placed in a hot air circulating drying machine preset to 110° C. and heated for 30 minutes for completion of the polymerization.

After polymerization, the lens-shaped polymer product and the plate-like polymer product were immersed in 50 vol % ethanol aqueous solution for 4 hours, and substituted with distilled water and further with a soft contact lens rinsing liquid (trade name: PURE SOAK S, made by HOYA Corporation), so that a soft contact lens and a plate-like polymer product were obtained. The produced soft contact lens and the plate-like polymer product were measured and evaluated. The results are shown in Table 1. The produced soft contact lens had high transparency and highly wettable surface.

Comparative Examples 1 to 5 (System not Having GlyMA as Component)

The monomer composition of a soft contact lens was prepared according to the composition described in Table 2 so as to obtain a monomer mixture solution. The monomer mixture solution was filled into a both-face cast mold of polypropylene for making a contact lens and into a cell made of polypropylene plates which sandwich a polyethylene terephthalate sheet having a different thickness as spacer. The mold and the cell were placed in a hot air circulating drying machine preset to 110° C. and heated for 60 minutes for completion of the polymerization. After polymerization, the lens-shaped polymer product and the plate-like polymer product were immersed in 50 vol % ethanol aqueous solution for 4 hours, and substituted with distilled water and further with a soft contact lens rinsing liquid (trade name: PURE SOAK S, made by HOYA Corporation), so that a soft contact lens and a plate-like polymer product were obtained. The produced soft contact lens and the plate-like polymer product were measured and evaluated. The results are described in Table 2. The contact lens in Comparative Examples 1 to 3 had water repellency after scrubbing, having almost no portion of the surface covered with a water film. When the contact lens in Comparative Examples 4 and 5 was immersed in 50 vol % ethanol solution, and then substituted with a soft contact lens rinsing liquid, the lens had white turbidity, which was not suitable for using as a contact lens.

Comparative Example 6 (System Using 2-Methacryloyloxyethyl Acid Phosphate as a Monomer Having Two or More Hydroxyl Groups in the Molecular Structure)

Using 2-methacryloyloxyethyl acid phosphate (the following formula E1) as component of a contact lens, a monomer mixture solution described in Table 2 was prepared. The monomer mixture solution was filled into a both-face cast mold of polypropylene for making a contact lens, and was placed in a hot air circulating drying machine preset to 110° C. and heated for 60 minutes for completion of the polymerization. After polymerization, the lens-shaped polymer product and the plate-like polymer product were immersed in 50 vol % ethanol aqueous solution for 4 hours, and substituted with distilled water and further with a soft contact lens rinsing liquid (trade name: PURE SOAK S, made by HOYA Corporation), so that a soft contact lens and a plate-like polymer product were obtained. The results are described in Table 2. The produced soft contact lens was colored in yellow, having water repellency after scrubbing and washing, with almost no portion covered with a water film on the contact lens surface.

[Formula 14]

(E1)

Comparative Example 7 (System using N-[tris(hydroxymethyl)methyl]acrylamide as a Monomer Having Two or More Hydroxyl Groups in the Molecular Structure)

Using N-[tris(hydroxymethyl)methyl]acrylamide (the following Formula E2) as component of a contact lens, a monomer mixture solution described in Table 2 was prepared. However, N-[tris(hydroxymethyl)methyl]acrylamide was not dissolved at all.

[Formula 15]

(E2)

Comparative Example 8 (Use of Silicone Monomer not Having a Hydroxyl Group or Polyethylene Glycol Group in Molecular Structure)

Using methacryloyloxyethylsuccinic acid 3-[tris(trimethylsiloxy)silyl]propyl (the following formula E3) as a component of the contact lens, a monomer mixture solution described in Table 2 was prepared. However, the solution was separated into two layers, so that a homogeneous monomer mixture solution with glycerol methacrylate was not obtained.

[Formula 16]

(E3)

Comparative Example 9 (Use of a Silicone Monomer not Having a Polyethylene Glycol Group or a Hydroxyl Group in the Molecular Structure)

Using tris(trimethylsiloxy-γ-methacryloxypropylsilane (the following formula E4) as a component of the contact lens, a monomer mixture solution described in Table 2 was prepared. However, the solution was separated into two layers, so that a homogeneous monomer mixture solution with glycerol methacrylate was not obtained.

[Formula 17]

(E4)

Comparative Example 10 (Use of a Silicone Monomer not Having a Polyethylene Glycol Group or a Hydroxyl Group in the Molecular Structure)

Using tris(trimethylsiloxy)silylpropylvinyl carbamate (the following formula E5) as a component of the contact lens, a monomer mixture solution described in Table 2 was prepared. However, the solution was separated into two layers, so that a homogeneous monomer mixture solution with glycerol methacrylate was not obtained.

[Formula 18]

(E5)

TABLE 1

| | | Example | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| Component (a): Si monomer (having OH and PEG) | 4Si-6PEG | 50 | 40 | 50 | 50 | 50 | 30 | 35 | 10 | 10 | | | | | | | |
| | 3Si-9PEG | | | | | | | | | | | | | | | 15 | 7 |
| | 3Si-GMA | | | | | | 30 | | 60 | 50 | 45 | 45 | 45 | 35 | 30 | 30 | 33 |
| Component (b) | GlyMA | 50 | 60 | 40 | 40 | 40 | 40 | 30 | 28 | 26.5 | 15 | 25 | 35 | 25 | 20 | 45 | 60 |
| Component (c): Si monomer (not having OH and PEG) | MTS | | | | | | | | | 10 | | | | 10 | 15 | | |
| | TRIS | | | | | 5 | | | | | | | | | | | |
| | TRIS-VC | | | | | | | | | | | | | | | | |
| Component (d): Hydrophilic monomer | HEMA | | | 10 | | 8 | | 30 | | | 30 | 20 | 10 | 20 | 25 | 10 | |
| | NVP | | | | 10 | | | | | | 10 | 10 | 10 | 10 | 10 | | |
| | MAA | | | | | 2 | | | 2 | 3.5 | | | | | | | |
| | DMAA | | | | | | | | | | | | | | | | |
| Component (e): Cross-linking agent | EDMA | 0.3 | 0.3 | 0.2 | | 0.4 | 0.3 | 0.4 | 0.4 | 0.4 | | | 0.2 | 0.2 | | 0.4 | 0.8 |
| | DAM | | | | 0.2 | | | | | | | | | | 0.4 | 0.4 | | |
| | VMA | | | | | | | | | | | 0.3 | | | | | | |
| Component (f): Other monomer | P-1M | | | | | | | | | | | | | | | | | |
| | TRIS-AA | | | | | | | | | | | | | | | | | |
| Component (g): Polymerization initiator | AIBN | | | | | | | | | | | 0.6 | 0.6 | | | | | |
| | BAPO | 0.6 | 0.6 | 0.6 | 0.6 | 0.4 | 0.6 | 0.4 | 0.4 | 0.4 | 0.6 | | | 0.4 | 0.4 | 0.6 | 0.4 |
| Properties of monomer mixture solution | | ○ | ○ | ○ | ○ | ○ | ○ | ○ | ○ | ○ | ○ | ○ | ○ | ○ | ○ | ○ | ○ |
| Evaluation on transparency of soft contact lens | | ○ | ○ | ○ | ○ | ○ | ○ | ○ | ○ | ○ | ○ | ○ | ○ | ○ | ○ | ○ | ○ |
| Wettability | | ○ | ○ | ○ | ○ | ○ | ○ | ○ | ○ | ○ | ○ | ○ | ○ | ○ | ○ | ○ | ○ |
| Moisture content (%) | | 31 | 36 | 29 | 33 | 45 | 24 | 30 | 25 | 31 | 25 | 28 | 32 | 28 | 28 | 34 | 38 |
| Oxygen permeability coefficient ($\times 10^{-11}$ (cm$^2$/sec) · (mLO$_2$/mL × mmHg)) | | 48 | 35 | 48 | 47 | 47 | 65 | 41 | 94 | 90 | 42 | 42 | 40 | 45 | 51 | 39 | 35 |
| Contact angle by sessile drop method (°) | | 110 | 108 | 110 | 110 | 105 | 107 | 116 | 103 | 109 | 107 | 111 | 117 | 118 | 102 | 104 | 105 |
| Contact angle by captive bubble method (°) | | 28 | 28 | 29 | 29 | 29 | 28 | 30 | 27 | 25 | 27 | 26 | 28 | 28 | 28 | 27 | 27 |

The unit of the component ratio in the table is percentage by weight. (The ratios of cross-linkable monomer and the polymerization initiator are calculated to the total amount monomers.)

TABLE 2

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| Component (a): Si monomer (having OH and PEG) | 4Si-6PEG | 50 | | | | | | | | | |
| | 3Si-9PEG | | 40 | | | | | | | | |
| | 3Si-GMA | | | 50 | 45 | | 45 | 45 | | | |
| Component (b) | GlyMA | | | | | | | | 50 | 50 | 50 |
| Component (c): Si monomer (not having OH and PEG) | MTS | | | | | 45 | | | 50 | | |
| | TRIS | | | 5 | | | | | | 50 | |
| | TRIS-VC | | | | | | | | | | 50 |
| Component (d): Hydrophilic monomer | HEMA | 30 | 35 | 30 | 40 | 40 | 25 | 35 | | | |
| | NVP | | | | 15 | 15 | 10 | 10 | | | |
| | MAA | | | | | | | | | | |
| | DMAA | 20 | 20 | 20 | | | | | | | |
| Component (e): Cross-linking agent | EDMA | 0.6 | 0.6 | 0.3 | | | | | 0.4 | 0.4 | 0.4 |
| | DAM | | | | | | 0.2 | 0.2 | | | |
| | VMA | | | | 0.3 | 0.3 | | | | | |
| Component (f): Other monomer | P-1M | | | | | 20 | | | | | |
| | TRIS-AA | | | | | | | 10 | | | |
| Component (g): Polymerization initiator | AIBN | 0.4 | 0.4 | 0.6 | 0.6 | 0.6 | 0.6 | 0.6 | | | |
| | BAPO | | | | | | | | 0.4 | 0.4 | 0.4 |
| Properties of monomer mixture solution | | ○ | ○ | ○ | ○ | ○ | ○ | X | X | X | X |
| Evaluation on transparency of soft contact lens | | ○ | ○ | ○ | X | X | X | — | — | — | — |
| Wettability | | X | X | X | — | — | — | — | — | — | — |
| Moisture content (%) | | 36 | 40 | 35 | — | — | — | — | — | — | — |
| Oxygen permeability coefficient ($\times 10^{11}$ (cm$^2$/sec) · (mLO$_2$/mL × mmHg)) | | — | — | — | — | — | — | — | — | — | — |
| Contact angle by sessile drop method (°) | | 117 | 117 | 115 | — | — | — | — | — | — | — |

TABLE 2-continued

| | Comparative Example | | | | | | | | | |
|---|---|---|---|---|---|---|---|---|---|---|
| | 1 | 2 | 3 | 4 | 5 | 6 | 7 | 8 | 9 | 10 |
| Contact angle by captive bubble method (°) | 34 | 34 | 33 | — | — | — | — | — | — | — |

The unit of the component ratio in the table is percentage by weight. (The ratios of cross-linkable monomer and the polymerization initiator are calculated to the total amount monomers.)

The invention claimed is:

1. A silicone hydrogel soft contact lens, which has a wettable surface and is obtained by a process comprising:
polymerizing a mixed solution of
a first silicone monomer comprising a hydroxyl group or a polyethylene glycol group and 4 or fewer silicon atoms and a molecular weight of less than 1,000 and a glycerol mono(meth)acrylate,
wherein, once wetted, the lens surface is uniformly covered with a water film.

2. The silicone hydrogel soft contact lens according to claim 1, wherein the first silicone monomer is represented by formula (I):

$$X-O-(CH_2CH_2O)_m-(CH_2-CH(OH)-CH_2-O)_n-CH_2CH_2CH_2-Si\left(-O-Si(R^2)(R^3)(R^4)\right)_a R^{1}{}_{3-a}$$ (I)

where
R1, R2, R3, and R4 are each a methyl group,
a represents an integral number of 1-3,
n represents 0 or 1,
m represents 0 or 4-10, provided that when n is 1, m is 0, and when n is 0, m is 4-10, and
X is one selected from the group consisting of substituents represented by formulae (Y1)-(Y3):

(Y1)

(Y2)

(Y3)

3. The silicone hydrogel soft contact lens according to claim 1, wherein the mixed solution comprises 30-70 wt. % of the first silicone monomer and 15-60 wt. % of glycerol mono(meth)acrylate.

4. The silicone hydrogel soft contact lens according to claim 1, wherein the mixed solution comprises:
(a) 30-70 wt. % of the first silicone monomer,
(b) 15-60 wt. % of glycerol mono(meth)acrylate,
(c) 0-20 wt. % of a second silicone monomer not comprising a hydroxyl group or a polyethylene glycol group,
(d) 0-50 wt. % of a hydrophilic monomer, and
(e) 0.1-1 wt. % a cross-linkable monomer.

5. The silicone hydrogel soft contact lens according to claim 4, wherein the second silicone monomer (c) is present and is at least one selected from the group consisting of tris(trimethylsiloxy)-γ-methacryloxypropylsilane and metacryloyloxyethylsuccinic acid 3-[tris(trimethylsiloxy)silyl] propyl.

6. The silicone hydrogel soft contact lens according to claim 4, wherein the hydrophilic monomer (d) is present and is at least one selected from the group consisting of 2-hydroxyethylmethacrylate, N-vinyl-2-pyrrolidone, and methacrylic acid.

7. The silicone hydrogel soft contact lens according to claim 1, wherein the both-face cast mold is composed of polypropylene.

8. The silicone hydrogel soft contact lens according to claim 1, which has a moisture content of 20% or more and less than 50%.

9. A process for manufacturing a silicone hydrogel soft contact lens, the process comprising:
preparing a mixed solution by mixing at least one silicone monomer that comprises a hydroxyl group or polyethylene glycol group and comprises 4 or fewer silicon atoms and a molecular weight of less than 1,000 and, and a glycerol mono(meth)acrylate;
filling the mixed solution into a both-face cast mold; and
polymerizing the mixed solution in the both-face cast mold,
whereby, once wetted, the lens surface of the resultant soft contact lens is uniformly covered with a water film.

10. A process according to claim 9, which does not require applying a treatment to improve surface water wettability to a lens-shaped material after said polymerizing.

11. The silicone hydrogel soft contact lens according to claim 1, wherein the mixed solution does not include a high molecular weight hydrophilic polymer that enhances surface water wettability of the silicone hydrogel soft contact lens.

12. A process according to claim 9, wherein the mixed solution does not include a high molecular weight hydrophilic polymer that enhances surface water wettability of the silicone hydrogel soft contact lens.

* * * * *